United States Patent Office 2,769,781
Patented Nov. 6, 1956

2,769,781

KETTLE-COOLED LITHIUM STEARATE GREASE CONTAINING AN ALIPHATIC MONOHYDRIC ALCOHOL

Richard A. Butcosk, East Hempstead, N. Y., assignor to Socony Mobil Oil Company, Inc., a corporation of New York No Drawing. Application September 19, 1951, Serial No. 247,368

4 Claims. (Cl. 252—40)

The present invention relates to lithium stearate greases and, more particularly, to the preparation of lithium stearate greases.

Lithium stearate greases are greases having a mineral oil base containing lithium stearate as the primary gelation agent. The earlier lithium base greases were not uniform in quality. This is emphasized by the patentee of U. S. Patent No. 2,397,956 who states that prior to 1943 it had been proposed to manufacture lubricants containing lithium soaps of the fatty acids, as for example lithium stearate or lithium oleate. This patentee also states that during the manufacture of such greases, difficulties have been experienced in obtaining successive batches of grease having the same uniform characteristics. For example, in the manufacture of a grease containing lithium stearate, one batch of the grease may produce a relatively hard grease, and the succeeding batch may produce a much softer grease. The patentee states that these difficulties are eliminated when the grease is made with a lithium soap of a hydroxystearic acid, preferably a lithium soap of 12-hydroxystearic acid or a lithium soap of hydrogenated castor oil.

This patentee prepares a grease containing lithium soap of hydrogenated castor oil as follows: 37.0 grams of hydrogenated castor oil are mixed with 370 grams of paraffin neutral oil and heated to approximately 175° F. in a small kettle. Thereafter, 60 grams of lithium hydroxide are dissolved in approximately 700 grams of water and added to the mixture in the kettle. Reaction is immediately started and heating is continued until the grease is nearly dry. Then 790 grams of 200 paraffin oil, 350 grams of 2000 Coastal oil and 720 grams of 120 bright stock are added slowly during one hour while the reaction mass is heated, from about 250° to 375° F. The temperature is then raised to about 425° F. at which temperature the mass is fluid. The heating is stopped and the grease allowed to cool to about 275° and then dumped into a metal pan where it is allowed to cool to room temperature.

In producing a grease containing a plurality of soaps, one of which is a lithium soap of an unsaturated hydroxy fatty acid, or a hydroxy stearic acid, or a 12-hydroxy stearic acid or a lithium soap of hydrogenated castor oil, or a lithium soap of the fatty acids of hydrogenated castor oil, or a mixture of any of the foregoing according to this patentee, there may also be incorporated in the grease during the manufacture thereof, a non-lithium soap which may be a metal soap of a metalloid soap or a soap made by the saponifying of a soap-forming ingredient with an organic compound. However, this patentee prefers to make a grease containing the lithium soap and then make a grease containing the non-lithium soap, and then to mix the greases when cold, as this tends to produce a more uniform grease. Such greases containing a plurality of soaps contain 60 to 90% lithium soap and 10 to 40% non-lithium soap formed by saponifying hydrogenated castor oil or the fatty acids of hydrogenated castor oil.

Thus, this patentee proposed to overcome the deficiencies of lithium stearate or oleate base greases by replacing the stearic or oleic acid with an hydroxystearic acid.

Subsequently, Butcosk was granted U. S. Patent No. 2,445,936 for a lithium stearate base grease. This grease is made by placing in a kettle 25% of the total oil and the entire amount of the fatty acid and heating the mixture to between about 160° to 180° F. Then the entire amount of lithium hydrate in aqueous solution is added. The resulting mixture is then stirred constantly and as soon as the water has been removed and the soap formed, more oil is added until approximately 90% of the total amount has been added. At this point the grease is a fluid product, having been brought up to a temperature between about 380° to 390° F. or even higher. The acidity or alkalinity of the grease is then adjusted to neutral and a petroleum sulfonate and a metal soap of 12-hydroxy stearic acid are added. Thereafter, the balance of the oil is mixed with the zinc soap of 12-hydroxy stearic acid and the mixture introduced into the fluid lithium soap grease. Thereafer, the hot grease which usually has a temperature varying between 340° and 360° F. is drawn from the cooking kettle into a cooling rack which contains pans which are five feet long, two feet wide, and five inches deep. The grease cools from approximately 340° to 360° F. to approximately 90° F. in about 12 hours.

It is manifest, in view of the two foregoing descriptions, that lithium base greases whether made with lithium hydroxy stearate or lithium stearate as the soap base, have been pan-cooled. However, pan-cooling is one of the undesirable features of the present conventional and customary method of manufacturing lithium base greases because of the large area required for the cooling step and because it does not permit agitation of the grease while cooling. On the other hand, agitation of greases during cooling generally leads to better uniformity.

It has now been discovered that the advantages of kettle-cooling in contrast to pan-cooling can be obtained in the manufacture of lithium base greases by adding a gel stabilizer to the grease.

Accordingly, it is an object of the present invention to provide a grease having a lithium soap of a fatty acid other than hydroxy fatty acids as the primary gelation agent and containing a gel stabilizer. It is another object of the present invention to provide a lithium stearate base grease formulation capable after kettle-cooling of providing a grease having a satisfactory smooth texture. It is a further object of the present invention to provide a method of manufacturing lithium stearate base greases involving kettle-cooling in contrast to prior pan-cooling of lithium stearate base greases. Other objects and advantages will become apparent from the following description.

The data presented in Table I demonstrate clearly that lithium stearate greases devoid of a gel stabilizer when kettle-cooled are not satisfactory greases, whereas when a gel stabilizer is included in the formulation the kettle-cooled grease is satisfactory. Four greases were prepared as follows:

A kettle was charged with about 30 to 40% of the total amount of mineral oil of the formulation, the stearic acid and the lime flour. The kettle stirrer was set in motion and the contents heated to about 140° F. during about 20–30 minutes. Then the lithium hydroxide was added as a 20% aqueous solution thereof and the mixture heated to about 390°–400° F. during a period of about 1.5 to 2 hours. Thereafter, the balance of the mineral oil of the formulation was added together with all of the additives, such as oxidation inhibitors. Subsequently, the mixture was heated to about 390°–400° F. during about 1–1.5 hours. The fluid grease was then transferred to a steam jacketed kettle, equipped with paddles, sweep and scrapers, which was at ambient temperature (about 90° F.) The fluid grease was cooled to about 150°–130° F. during 2.5 to 3 hours depending upon the size of the batch while stirring the grease in the kettle. Stirring can be continued until the grease becomes too stiff to stir, but it is not necessary.

TABLE I

| Grease number | 1 | 2 | 3 | 4 |
|---|---|---|---|---|
| Components: | | | | |
| Stearic acid percent by weight | 9.50 | 8.50 | 10.00 | 9.50 |
| Lithium hydroxide mono-hydrate___do____ | 1.15 | 1.00 | 1.30 | 1.15 |
| Lime flour_____do____ | 0.45 | 0.45 | 0.30 | 0.45 |
| Sodium stearate___do____ | | 1.00 | | |
| Sodium soap of hydrogenated Sperm oil_____do____ | | | | 1.00 |
| Sodium soap of 12-hydroxy stearic acid_____do____ | | | 1.00 | |
| Oxidation inhibitors do____ | 0.20 | 0.20 | 0.20 | 0.20 |
| 800″ SUV at 100° F. naphthenic mineral oil_____do____ | 88.70 | 88.85 | 87.20 | 87.70 |
| Appearance of grease | Grainy | Grainy | Smooth | Smooth |
| Penetration, A. S. T. M. (unworked/worked) | 334/330 | 330/335 | 321/327 | 318/326 |
| Shell rolling stability, 4 hrs. micropenetration | | | 135/147 | 130/145 |
| Water absorption (U. S. Specification O. S. 1350), percent | 100 | 100 | 80 | 40 |
| Work stability (50,000 strokes, 1/16″ holes) | 425+ | 425+ | 392 | 423 |

By a comparison of Formulae 1 and 2 on the one hand with Formulae 3 and 4 on the other, those skilled in the art will recognize that the former did not respond to kettle-cooling and produced a grease having an unsatisfactory grainy structure whereas the formulae of batches 3 and 4 did respond to kettle-cooling and produced smooth, homogeneous greases. The difference between Formula 1 and Formula 3 is that the latter contains a sodium soap of 12-hydroxy stearic acid as a gel stabilizer. The difference between Formula 2 and Formula 4 is that the latter contains the sodium soap of hydrogenated sperm oil.

Hydrogenated sperm oil has the following characteristics:

Melting point, °F _____ 118–126
Free fatty acids, percent _____ 2
Saponification No. (mg. KOH/g.) _____ 135–145
Iodine No. _____ 6 (max.)
Unsaponifiables, percent _____ 35

This product contains about 2.0% glyceride and the balance is esters of the high molecular weight ($C_{12}$—$C_{18}$) aliphatic monohydric alcohols. The saponification number is for total saponification which includes the saponification of the glycerides and the alcohol esters. The alcohols are present as esters in the hydrogenated sperm oil in the concentrations shown in the following tabulation:

| | Percent |
|---|---|
| Myristyl alcohol (tetradecanol, $C_{14}$) | 1.1 |
| Cetyl alcohol (1 hexadecanol, $C_{16}$) | 18.4 |
| Octadecyl alcohol (9 octadecanol, $C_{18}$) | 1.5 |
| Stearyl alcohol (octadecanol, $C_{18}$) | 12.5 |

Since the hydrogenated sperm oil of commerce (available as Spermofol 52) is a mixture of higher alcohols and the fatty acids from sperm oil and since Formula 2 includes sodium stearate, the equivalent of the sodium soap of the fatty acids of hydrogenated sperm oil, it follows that the gel stabilizer in Formulation 4 is the higher alcohols present in hydrogenated sperm oil.

This has been confirmed as is manifest from a study of the data presented in Table II.

It will be noted that while the higher molecular weight monohydric aliphatic alcohols are effective as gel stabilizers in the kettle cooling of lithium stearate-base greases, glycerine representative of a polyhydric alcohol is not (Example No. 9).

Referring to Table II, it will be observed that in Example Nos. 1 and 2, in the formulations of which no gel stabilizer is included, the kettle-cooled products are unsatisfactory because of graininess, whereas the kettle-cooled products of Examples Nos. 3, 4, 5, 6, 7 and 8 are satisfactory in every respect including a smooth texture.

TABLE II

Summary of Experimental Work on Mixed Lithium Base Greases

| | No. 1 | No. 2 | No. 3 | No. 4 | No. 5 | No. 6 | No. 7 | No. 8 | No. 9 |
|---|---|---|---|---|---|---|---|---|---|
| Stearic acid_____percent by weight__ | 9.50 | 8.50 | 10.00 | 9.50 | 9.50 | 9.50 | 9.30 | 9.50 | 9.50 |
| 12-hydroxy stearic acid_____do____ | | | 0.85 | | | | | | |
| Lithium hydroxide (mono-hydrate)__do__ | 1.15 | 1.00 | 1.30 | 1.15 | 1.45 | 1.15 | 1.00 | 1.15 | 1.15 |
| Sodium hydroxide_____do____ | | | 0.15 | 0.20 | 0.20 | | 0.15 | | |
| Lime flour (calcium hydroxide)_____do____ | 0.45 | 0.45 | 0.30 | 0.45 | | 0.45 | 0.45 | 0.45 | 0.45 |
| Hydrogenated sperm oil_____do____ | | | | 0.85 | 0.85 | | | | |
| Mixed solid alcohols [1]_____do____ | | | | | | | 0.25 | 0.25 | |
| Glycerine_____do____ | | | | | | | | | 0.08 |
| Oleyl alcohol_____do____ | | | | | | | | 0.20 | |
| Oxidation inhibitor (amine type)__do__ | 0.20 | 0.20 | 0.20 | 0.20 | 0.20 | 0.20 | 0.20 | 0.20 | 0.20 |
| Mineral oil, naphthenic, 800″ at 100° F. do____ | 88.70 | 89.85 | 87.20 | 87.65 | 87.80 | 88.45 | 88.65 | 88.50 | 88.62 |
| Appearance of grease | Grainy | Grainy | Smooth | Smooth | Smooth | Smooth | Smooth | Smooth | Grainy |
| Penetration, A. S. T. M. (unworked/worked) | 334/330 | 330/335 | 321/327 | 318/326 | 263/263– | 330/339 | 360/351 | 320/330 | 412/425+ |
| Shell rolling stability, 4 hrs. micropenetration | | | 135/147 | 130/145 | 85/150 | 141/303 | 165/223 | 134/190 | |
| Water absorption (U. S. Specification O. S. 1350)_____percent__ | 100 | 100 | 80 | 40 | 45 | 45 | 95 | 60 | |

[1] The average analysis of the solid alcohols employed is: Myristyl alcohol (tetradecanol, $C_{14}$), 3.3%; cetyl alcohol (1 hexadecanol, $C_{16}$), 54.9%; octadecyl alcohol (9 octadecanol, $C_{18}$), 4.5%; stearyl alcohol (octadecanol, $C_{18}$), 37.3%.

Thus, it is manifest that a smooth textured lithium-base grease can only be obtained when kettle-cooled by incorporating in the grease a gel stabilizer of the class described hereinbefore. Accordingly, the gel stabilizers of the present invention are alkali metal or alkaline earth metal soaps of hydroxy stearic acids, preferably 12-hydroxy stearic acid, a mixture of such soaps, and monohydric aliphatic alcohols having 12 to 34 carbon atoms, preferably 16 to 34 carbon atoms and mixtures of two or more of said monohydric aliphatic alcohols.

Therefore, gel stabilizers of the present invention are (1) a minor proportion of hydroxy fatty acid soaps particularly the sodium soap of 12-hydroxy stearic acid in a concentration effective to produce a smooth textured kettle-cooled grease say about 1 to about 2% calculated as sodium 12-hydroxy stearate and (2) a minor proportion, effective to produce a smooth textured, kettle-cooled grease of the higher monohydric aliphatic alcohols having from 12 to 34 carbon atoms, preferably 16 to 34 carbon atoms, such as cetyl, ceryl, the alcohol of Chinese wax, melissyl alcohol, $C_{31}H_{63}OH$, from beeswax or carnauba wax, other alcohols having 32 and 34 carbon atoms and present in carnauba wax in a concentration of 0.3 to about 2.0 percent by weight.

Accordingly, lithium stearate base greases can be prepared with kettle-cooling instead of conventional pan-cooling in the following manner:

A suitable container is charged with a portion of the total mineral oil required to make the grease, say 30 to 40% of the total, the hydroxy stearic acid or higher aliphatic monohydric alcohol, i. e., gel stabilizer and the mixture heated to about 140° F. to about 150° F. The caustic soda in aqueous solution is then added and the temperature maintained within the range 150° to 180° F. Thereafter the remainder of the fatty material and the dry lime flour are added. After stirring for a short time the lithium hydroxide is added in aqueous solution. Following the addition of the lithium hydroxide, the mixture is heated to complete the saponification and to dehydrate the mixture. Thereafter the balance of the mineral oil is added and the grease heated to bring the soaps into solution. A temperature of about 390°–400° F. and about 3 to about 5 hours depending upon the size of the batch is usually sufficient. Thereafter such additives as oxidation inhibitors and water repellents are added. The liquid mixture is then transferred to a suitable device wherein the rate of cooling of the liquid grease can be controlled which is provided with a stirring mechanism and the fluid grease slowly cooled to ambient temperature (about 90° F.) in about 3–8 hours depending upon the size of the batch. A suitable device is a steam-jacketed kettle which has been preheated to about 200° F. to slow down the cooling rate. Preferably, the mixture is paddled or stirred slowly, a rate of 60 R. P. M. has given satisfactory results, from the liquid state (about 400° F.) to ambient temperature (about 90° F.).

The addition of the components of the formulation can be varied. For example, a portion of the mineral oil of the formulation say 30–40% of the total, the stearic acid and the lime flour is charged to a suitable kettle and heated to about 140° F. Then the lithium hydroxide is added as an aqueous solution containing say 20% lithium hydroxide. The concentration is not too important but of interest since the added water must be driven off later. Thereafter, the mixture is heated to dehydrate the batch and the balance of the mineral oil, sodium stearate and high molecular weight monohydric aliphatic alcohol and sodium soaps of hydrogenated sperm oil and other additives are added. The temperature of the mixture is raised to about 390°–400° F. within about 1–1.5 hours depending upon the size of the batch, and the liquid grease transferred to a container and cooled to ambient temperature preferably whilst the grease is paddled at least until the temperature thereof has dropped to about 150°–135° F. and, when desirable, until the temperature has reached ambient temperatures. This will require about 2.5 to about 3 hours depending upon the size of the batch.

A suitable formulation for the preparation of kettle-cooled lithium stearate base grease is the following:

| | Percent weight |
|---|---|
| Hydroxystearic acid [1] | 1.0 |
| Sodium hydroxide | 0.2 |
| Stearic acid | 10.0 |
| Lime flour | 0.3 |
| Lithium hydroxide (mono-hydrate) | 1.3 |
| Mineral oil S. U. V. at 100° F. 800 seconds | 85.8 |
| Phenyl alpha naphthyl amine | 0.2 |
| Basic barium salt of wax benzene (2–12) sulfonate | 1.0 |
| Polymeric isobutylene molecular weight about 700,000 [2] | 0.2 |
| | 100.0 |

[1] Preferably 12-hydroxystearic acid available as "Hydrofol Fatty Acid 200."
[2] Available under the trade name "Paratac."

In general, the phenylalphanaphthylamine can be replaced by any other suitable oxidation inhibitor, the polymeric isobutylene by any compatible tackiness improver and the basic barium salt of wax benzene sulfonate by any soap capable of modifying the structure of the grease. Those skilled in the art will recognize that the foregoing formulation provides for formation of all of the soaps in situ and that the gel stabilizer is a soap of a hydroxystearic acid, specifically 12-hydroxystearic acid.

On the other hand, the formulations given in columns 3 and 4 of Table I are illustrative of formulations in which the lithium stearate is formed in situ but the other soaps are added as such and not formed in situ. The formula of column 3 of Table I is illustrative of a grease containing a soap of a hydroxystearic acid, specifically 12-hydroxystearic acid, as a gel stabilizer while the formulation of column 4 is illustrative of a grease containing a high molecular weight aliphatic monohydric alcohol as a gel stabilizer.

A suitable formulation for a lithium stearate base grease, i. e., a grease in which about 60 to about 97% of the soaps present in lithium stearate and containing about 0.1 to about 0.5% of a gel stabilizer selected from the group consisting of monohydric aliphatic alcohols having 16 to 34 carbon atoms and mono-hydroxy stearic acids, is the following:

| | Percent weight |
|---|---|
| Stearic acid | 5 to 20 |
| Hydroxy stearic acid | 0.5 to 5 |
| Sodium hydroxide | 0.1 to 1.0 |
| Lithium hydroxide (monohydrate) | 0.65 to 2.6 |
| Lime flour | 0.15 to 1.0 |
| Mineral oil, 60 seconds to 3000 seconds, S. U. V. at 100° F | 93.5 to 68.4 |
| Oxidation inhibitor | 0.1 to 2.0 |

In general a suitable lithium stearate base grease will contain about 8 to about 13% lithium stearate, about 0.5 to about 2.0% sodium soaps, about 0.5 to about 3.0% alkaline earth soaps, about 0.1 to about 1.0% gel stabilizer, about 91.8 to about 84% mineral oil, and the balance additives well-known to those skilled in the art for inhibiting oxidation: alpha or beta napthylamine, phenyl-alpha or beta-naphthylamine, diphenylamine, 2,4 ditertiary butyl-6-methyl phenol, etc.

The foregoing can be summarized by stating that a lithium stearate base grease which can be kettle-cooled to a smooth texture is a grease containing lithium stearate to the extent of at least about 60% of the total soap present in the grease while the total soap in the grease amounts to at least about 5 to about 15 weight per cent. To make a kettle-cooled lithium stearate grease, it is necessary that the grease contain, as a gel stabilizer, about 0.5 to about 2 weight per cent of at least one metal salt of a hydroxy-stearic acid, such as 12-hydroxystearic acid, and an alkali metal or alkaline earth metal, i. e., sodium, potassium, lithium, calcium, barium, magnesium, hydroxy stearate and preferably about 0.85 to about 1.15 weight percent of 12-hydroxy stearate of the metals enumerated hereinbefore and/or about 0.5 to about 2 weight percent, preferably about 0.9 to about 1.2 weight percent, of a monohydridic aliphatic alcohol having 16 to 34 carbon atoms in the molecule.

It is therefore apparent that the present invention is that improvement in the manufacture of lithium stearate base greases, i. e., greases in which at least 60% of the total soap is calculated to be lithium stearate, which comprises adding to the lithium stearate grease before cooling an amount of gel stabilizer selected from the group consisting of monohydric aliphatic alcohols having 12 to 34 carbon atoms, alkali metal hydroxy-stearate and alkaline earth metal hydroxy-stearates, effective to provide a smooth textured kettle-cooled grease and the product thereby obtained.

It is to be noted that lithium stearate base greases are to be differentiated from greases having lithium hydroxystearate as the principal soap. Puryear et al., in U. S. Patent No. 2,450,254, state that the phenomenon of not breaking down under the severe conditions of the dynamic shear test described therein is characteristic of the lithium soap greases prepared from hydroxy fatty acid glycerides whereas the lithium stearate greases representative of the conventional fatty and fatty acids break down to a liquid or semi-liquid product.

I claim:

1. A kettle-cooled, smooth-textured, lithium stearate base grease containing from about 0.1 to about 1 percent by weight, based upon the grease charge, of a sole gel stabilizer consisting essentially of an aliphatic monohydric alcohol having from 12 to 34 carbon atoms per molecule.

2. A kettle-cooled, smooth-textured, lithium stearate base grease containing from about 0.1 to about 1 percent by weight, based upon the grease charge, of a sole gel stabilizer consisting essentially of sperm oil alcohol.

3. A kettle-cooled, smooth-textured, lithium stearate grease containing calcium stearate and containing from about 0.1 to about 1 percent by weight, based upon the grease charge, of a sole gel stabilizer consisting essentially of an aliphatic monohydric alcohol having from 12 to 34 carbon atoms per molecule.

4. A kettle-cooled, smooth-textured, lithium stearate grease comprising:

| | Percent by weight |
|---|---|
| Stearic acid | 5 to 20 |
| Hydroxy stearic acid | 0.5 to 5 |
| Sodium hydroxide | 0.1 to 1.0 |
| Lithium hydroxide monohydrate | 0.65 to 2.6 |
| Lime flour | 0.15 to 1.0 |
| Mineral oil 60 seconds to 3000 seconds, S. U. V. at 100° F | 93.5 to 68.4 |
| Oxidation inhibitor | 0.1 to 2.0 |
| Aliphatic monohydric alcohol having from 16 to 34 carbon atoms per molecule, the said alcohol constituting the sole gel stabilizer present in said grease | 0.1 to 0.5 |

References Cited in the file of this patent

UNITED STATES PATENTS

| | | |
|---|---|---|
| 2,108,643 | Brunstrum et al. | Feb. 15, 1938 |
| 2,108,644 | Brunstrum | Feb. 15, 1938 |
| 2,283,602 | Fiero | May 19, 1942 |
| 2,397,956 | Fraser | Apr. 9, 1946 |
| 2,398,173 | Brunstrum et al. | Apr. 9, 1946 |
| 2,445,936 | Butcosk | July 27, 1948 |
| 2,450,220 | Ashburn et al. | Sept. 28, 1948 |
| 2,450,222 | Ashburn et al. | Sept. 28, 1948 |
| 2,475,589 | Bondi | July 12, 1949 |
| 2,545,190 | Bondi | Mar. 31, 1951 |
| 2,588,273 | Morway et al. | Mar. 4, 1952 |
| 2,595,556 | Worth et al. | May 6, 1952 |
| 2,629,695 | Matthews et al. | Feb. 24, 1953 |